United States Patent
Gemeto et al.

(10) Patent No.: US 10,756,927 B2
(45) Date of Patent: Aug. 25, 2020

(54) METHOD FOR VIRTUALLY CONNECTING TWO PERSONS, CORRESPONDING MEDIA AND SYSTEM

(71) Applicant: Gemalto SA, Meudon (FR)

(72) Inventors: Marc Gemeto, La Ciotat (FR); Jean-Yves Fine, La Ciotat (FR)

(73) Assignee: THALES DIS FRANCE SA, Meudon (FR)

( * ) Notice: Subject to any disclaimer, the term of this patent is extended or adjusted under 35 U.S.C. 154(b) by 212 days.

(21) Appl. No.: 14/429,795

(22) PCT Filed: Sep. 27, 2013

(86) PCT No.: PCT/EP2013/070269
§ 371 (c)(1),
(2) Date: Mar. 20, 2015

(87) PCT Pub. No.: WO2014/049147
PCT Pub. Date: Apr. 3, 2014

(65) Prior Publication Data
US 2015/0249902 A1    Sep. 3, 2015

(30) Foreign Application Priority Data
Sep. 27, 2012  (EP) .................................. 12306174

(51) Int. Cl.
*H04W 12/00* (2009.01)
*H04L 12/00* (2006.01)
(Continued)

(52) U.S. Cl.
CPC ...... *H04L 12/4641* (2013.01); *H04L 63/0492* (2013.01); *H04L 63/107* (2013.01);
(Continued)

(58) Field of Classification Search
CPC ........ H04B 5/00; H04B 5/0056; H04W 12/06
See application file for complete search history.

(56) References Cited

U.S. PATENT DOCUMENTS 8,219,028 B1    7/2012  Flamholz
8,863,258 B2 *  10/2014 Goldberg ................ G06F 21/31
                                                        455/456.1
(Continued)

FOREIGN PATENT DOCUMENTS

FR    2 903 545 A1    1/2008
JP    2005-086504 A   3/2005

OTHER PUBLICATIONS

International Search Report (PCT/ISA/210) dated Jan. 14, 2014, by the European Patent Office as the International Searching Authority for International Application No. PCT/EP2013/070269.
(Continued)

*Primary Examiner* — Ping Y Hsieh
(74) *Attorney, Agent, or Firm* — Buchanan Ingersoll & Rooney PC

(57) ABSTRACT

The invention specifically relates to a method for virtually connecting two persons, with the first person having a first NFC device and the second person having a second NEC device. One of the NFC devices is a telecommunications terminal comprising an application, and both NFC devices comprise the identity of the person to which they belong. According to the invention, the method includes transmitting the identity of the first person from the first NFC device to the second NFC device; transmitting the identity of the second person from the second NFC device to the first NFC device; generating a secret shared by the persons using the application, with the shared secret giving access to an Internet space shared by the persons; and storing the shared secret in the NFC devices, with a reference relating to the virtual connection thereof.

10 Claims, 1 Drawing Sheet

(51) Int. Cl.
*H04L 12/46* (2006.01)
*H04L 29/06* (2006.01)
*H04W 12/08* (2009.01)
*H04W 4/80* (2018.01)
*H04W 76/14* (2018.01)

(52) U.S. Cl.
CPC ............. *H04W 4/80* (2018.02); *H04W 12/08* (2013.01); *H04W 76/14* (2018.02)

(56) References Cited

U.S. PATENT DOCUMENTS

| | | | | |
|---|---|---|---|---|
| 2008/0090520 | A1* | 4/2008 | Camp | ................ H04B 5/00 455/41.2 |
| 2011/0076941 | A1* | 3/2011 | Taveau | ............... G06Q 10/10 455/41.1 |
| 2013/0237148 | A1* | 9/2013 | McCann | ............... H04W 4/008 455/41.1 |
| 2013/0324169 | A1* | 12/2013 | Kamal | ................ H04W 4/008 455/466 |
| 2014/0155033 | A1* | 6/2014 | Lazaridus | ........... H04M 1/6091 455/411 |

OTHER PUBLICATIONS

Office Action issued by the Chinese Patent Office dated Jan. 3, 2017 in corresponding Chinese Application No. 201380050271.1, Partial Translation (8 pages).
Written Opinion dated Aug. 15, 2016 issued by the Japanese Patent Office in corresponding Japanese Patent pplication No. JP 2015-533614 and English translation of the Written Opinion (6 pages).

* cited by examiner

METHOD FOR VIRTUALLY CONNECTING TWO PERSONS, CORRESPONDING MEDIA AND SYSTEM

The field of the invention is that of telecommunications and more particularly relates to a method for virtually connecting two persons, as well as corresponding system and media.

The invention aims at enabling at least two persons to exchange documents or to communicate via the Internet.

The rest of this description will refer to the case of a person who goes to a symposium, a show, a fair or a seminar. This person meets other persons who may offer to send her/him documents (product presentations, brochures, documents in pdf format, . . . ) electronically rather than delivering paper documents to this person personally. Conversely, a person who goes to a job fair does not always have and up to date resume (in paper form) with him/her and therefore can not give it to his/her contact. Other documents may have to be exchanged by these persons on a confidential basis (products or services prices, for example).

Now, this person does not necessarily have an email address (Internet address) where these other persons can send documents or web links to. Besides, some persons do not wish to give their Internet address to a stranger. Then there is no way for these persons to exchange documents electronically.

In another sector, the NFC technology is known in the field of telecommunications. This technology enables the user of a usually mobile terminal, such as a cellular phone or a smart phone, to make payments or provide information to a reader. Such information is, for example, personal information such as the name and the surname of the terminal owner. This information is typically stored in a SIM (UICC in the following description) card connected to the terminal (by wire or wireless connection), either stored in the terminal (retrievable) or integrated (non-retrievable, stored in an integrated circuit soldered in the terminal).

Personal information may also be stored in a non-powered element, such as a card containing a tag. The tag may also be glued to the card body. The tag comprises a memory wherein the name and the surname and possibly the address or telephone number of the holder are stored.

Various websites such as www.ciblesperso.com for example offer users to create their own NFC compatible tags.

The person wishing to obtain a tag enters his/her personal data on a site (name, address, phone number, . . . ) and an NFC card is then mailed to him/her. This person can then transmit his/her personal data to a reader, for example, a terminal (mobile phone for example) to another person by simply placing his/her card close to the terminal, and the communication is then provided through NFC. This concept is similar to the transmission of an electronic business card.

An electronic business card can also be transmitted by two mobile phones, by activating a dedicated function enabling two users to exchange their personal data. This transmission is also operated through NFC, by placing the two phones close to each other, with the NFC applications installed in the phones storing (for instance in the UICC) the data received from the other phone. The personal data to be transmitted are stored either in the phone or in the UICC.

The problem to be solved by the present invention is as follows: to enable a person having a NFC card containing his/her personal data or a mobile terminal with a NFC functionality (and comprising the holder's personal data) and wanting to be connected with another person, for example to later exchange documents, without necessarily having to exchange personal Internet addresses.

In this respect, the invention more particularly provides a method for virtually connecting two persons, with the first person having a first NFC device and the second person having a second NFC device. One of the NFC devices is a telecommunications terminal comprising an application, and both NFC devices comprise the identity of the person which they belong to.

According to the invention, the method consists in:
- transmitting the identity of the first person from the first NFC device to the second NFC device;
- transmitting the identity of the second person from the second NFC device to the first NFC device;
- generating a secret shared by the persons using the application, with the shared secret giving access to an Internet space shared by said persons;
- storing the shared secret in the NFC devices, with a reference relating to the virtual connection thereof.

In an advantageous embodiment, the reference relating to the virtual connection is the date on which the persons exchanged identities.

In another embodiment, the reference relating to said virtual connection is the place where said persons exchanged identities.

The telecommunication terminal is preferably a mobile terminal.

In a preferred embodiment, the share secret is an identifier associated with a password.

The invention also relates to a telecommunications terminal comprising an application intended to enable a virtual connection of two persons, with said telecommunications terminal comprising the identity of a first one of said persons, with the application being adapted to read the identity of the second one of said persons, with said identity of the second one of said persons being stored in a NFC device, with said application comprising means for:
- transmitting the identity of the first one of said persons from said telecommunications terminal to said NFC device;
- participating in the generation of a secret shared by the persons, with the shared secret giving access to an Internet space shared by the persons;
- storing the shared secret in the telecommunications terminal and in the NFC device, with a reference relating to the virtual connection.

As mentioned above, the reference relating to the virtual connection is the date on which or the place where the persons exchanged identities.

The shared secret is preferably an identifier associated with a password.

The invention also relates to a computer readable media comprising a software comprising instructions for enabling a virtual connection of two persons each having a NFC device, with one of the NFC devices being a telecommunications terminal comprising the identity of a first one of said persons, with the other NFC device comprising the identity of the second one of said persons, with said software being intended to be installed in the telecommunications terminal and able to read the identity of the second one of these persons. The instructions are intended to:
- transmitting the identity of the first one of said persons from said telecommunications terminal to said NFC device;
- participating in the generation of a secret shared by the persons, with the shared secret giving access to an Internet space shared by the persons;

storing said shared secret in the telecommunications terminal and in the NFC device, with a reference relating to the virtual connection.

Further characteristics and advantages of the invention will appear more clearly from reading the following description of one embodiment of the invention, provided as an illustrative and non-limiting example, in reference to the appended drawings, wherein:

FIG. 1 shows a system implementing the method according to the present invention.

Figure 1:
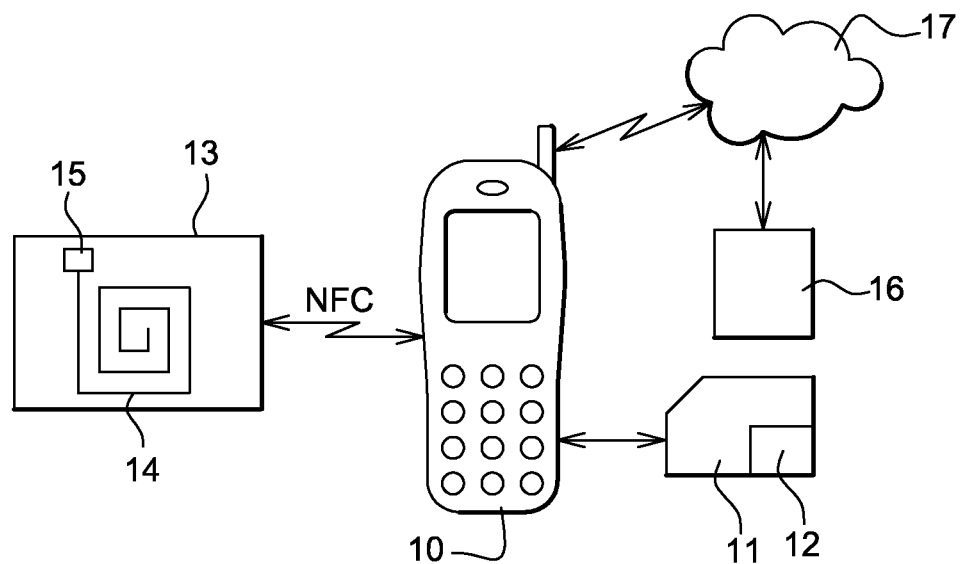
FIG. 1 shows a system implementing the method according to the invention.

This figure shows a telecommunications terminal 10, for example a portable terminal able to cooperate with a cellular network such as a GSM or UMTS network. The mobile terminal 10 cooperates with a security element 11 of the UICC or e-UICC (for "Embedded UICC") type. UICC-e is different from a conventional UICC in that it is integrated in the terminal 10 and not removable therefrom. This is typically a welded UICC.

This security element 11 knowingly comprises the IMSI/Ki identifiers enabling the terminal 10 holder to authenticate with the network of his/her mobile operator.

The security element 11 here contains an application 12 intended to enable a virtual connection of two persons. The first one of these persons is the owner of the terminal 10.

The second one of these persons holds a NFC device 13, here consisting of a NFC card. The NFC 13 card may be a simple physical plastic media whereon a NFC tag is attached (glued). The antenna 14 and the chip 15 of the NFC device 13 may also be integrated in the card body.

The NFC device 13 communicates with the terminal 10 via NFC, as will be described later.

The terminal 10 contains the identity of the holder thereof. Identity means any information making it possible to distinguish this person from another person, for example his/her name and his/her phone number. Such identities can be stored in the terminal 10, in the security element 11 or in the application 12.

Similarly, the NFC device 13 comprises the identity of the holder thereof (the identity of the second person is stored in the memory 15).

The terminal 10 comprises an application (which may be integrated in the application 12) able to read the identity stored in the NFC device 13. This reading is obtained after activation of the application 12 and physical tap of the terminal 10 and the device 13 so that the NFC communication can be established.

The application 12 also comprises means for transmitting the identity of the terminal 10 holder from the terminal 10 to the NFC device 13. The application 12 therefore writes the identity of the terminal holder 10 into the NFC device 31. This identity is stored in the memory 15.

The NFC communication established by the application 12 thus enables an exchange of identities between the holders of the elements 10 and 13.

The application 12 also participates in the generation of a secret shared by the two persons, with said secret giving access to an Internet space shared by said two persons.

The shared secret is for example an identifier or a "login" associated with a password. The shared secret is stored in the terminal 10 and the NFC device 13.

Thanks to this shared secret, the two users of a right of access to an Internet space they share, for example a Flickr (trademark) account. The shared secret can be associated with the Internet address of the site providing this shared space (www.flickr.com for example).

The shared secret is preferably associated with a reference relating to the virtual connection. "Reference relating to the virtual connection" means an indication subsequently enabling the two persons having exchanged their identities to trace the origin of this virtual connection (exchange of identities). This origin is, for example the date on which the persons exchanged their identities or the place where such an exchange took place. The date is known to the terminal 10 as well as the location (geo-location).

Access to the shared space is advantageously provided as follows: as for the terminal holder, he/she can look at the various exchanges of identities he/she operated, using the application 12. Such exchanges can be scanned by date or by location. Using a drop-down menu, the person may select an exchange among others and have direct access to the corresponding shared space (via an Internet connection). The person can also make a connection between his/her terminal and a computer connected to the Internet to access a given shared space via the computer.

As for the device 13 holder, he/she may access the shared space by placing the device 13 close to a card or tag reader of the NFC type connected to a computer. Software installed in the computer then reads the various exchanges of identities operated and offers the user to select the one of interest, to automatically open the corresponding shared space (automatic connection to the website and automatic filling of the fields that must contain the user name and password to give access to the shared space). The user may select the exchange of identity of interest using the reference relating to the virtual connection.

Once one of the two persons has gained access to a shared space, he/she can leave a message, post documents, etc. . . . , with such messages or documents being available to the person whom he/she exchanged identities with. Both persons then have a private space where they can exchange documents. The privacy of this space also enables the exchange of confidential documents, since access thereto is for the holders of the identifier and the associated password only.

The application 12 can autonomously generate the identifier and the password and check with the website if this identifier and the associated password is available (already assigned to an exchange or not). If the website certifies that the identifier and the password are available, it informs the application 12 which then authorizes the writing of such data into the device 13 and the terminal 10. If not so, the application 12 generates another identifier and/or another password, for example on a random basis, and contacts the website again until the latter indicates the availability thereof for the creation of a new shared site.

Another solution consists in associating the website with the generation of the identifier and the password: the application 12 requests from the website a username and a password enabling to create a new shared website and the website transmits an identifier/password couple to the application 12 which saves it and transmits it to the device 13.

In FIG. 1, the terminal 10 accesses a site 16 via the Internet 17, by radio.

The shared secret may also be a complex (secret) URL of the www.flickr.AEF0xYsqpmL58%032GtIUBmpawXyztype, an address which will be known to the persons having exchanged their identities only. Direct access to this URL is provided as mentioned above, by selecting the place or date of meeting.

The shared secret (complex URL or identifier+password, for example) can be generated from a hash of the phone numbers of the two persons and the time (or geographic coordinates) the identity were exchanged. The generation of a unique shared secret is thus guaranteed.

The shared secret may be valid for a fixed period only, for example 10 days, after which it will become invalid. In the case of a URL, it is possible to generate a complex address (of the "one time URL" type, see onetimesecret.com) which is valid for a specified period only.

The application 12 may also be located at the terminal 10 and not in the security element 11.

The exchange of identities between two terminals 10 (such as the one shown in FIG. 1) may also be operated via NFC, instead of a terminal and an NFC card 13. The application 12 may be present in one of the terminals only to generate the shared secret and save the reference relating to the virtual connection. In this context, one of the terminals plays the part of the tag or the NFC card. It comprises (in the terminal or in the associated UICC) an application enabling to answer a prompt from the other terminal (prompt for reading an identity) and to transmit this identity to the other terminal. Similarly, this application makes it possible to write the identity of the other person as well as the shared secret into a dedicated memory. The function of the tag may be included in the UICC, and in this case the tag emulates a UICC If the function of the tag is included in the terminal, such terminal will act as a tag.

Figure 2:
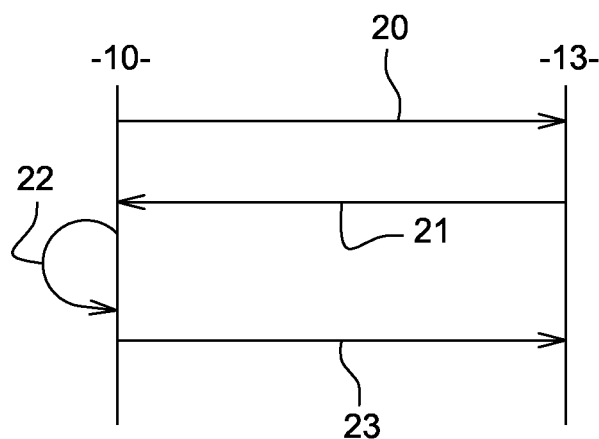
FIG. 2 shows the progress of the method according to the present invention

FIG. 2 shows the progress of the method according to the present invention

In this system, the virtual connection of two persons is considered, as mentioned above, with the first one of these persons having a first NFC device and the second one of these persons having a second NFC device, with one of the NFC devices being a telecommunications terminal comprising an application, and with each one of the NFC devices containing the identity of the person who holds it.

In the system described while referring to FIG. 1 and according to FIG. 2, the telecommunications terminal 10 comprises the application according to the present invention and communicates with a device 13 such as a NFC card.

The first step following the activation of the application is the transmission of the identity of the person owning the terminal device 10 from the first NFC device (terminal 10) to the second NFC device 20 (card 13). The second NFC device stores this identity and transmits its own identity, during a step 21, to the terminal 10 which stores it. Steps 20 and 21 are interchangeable.

The application 12 included in the terminal 10 generates (step 22) a secret shared by two persons. As mentioned above, this shared secret gives access to an Internet space shared by the two persons. This shared secret is then transmitted (step 23), with a reference relating to the virtual connection (date and/or place), from the terminal 10 to the card 13. The card 13 stores the shared secret and the reference relating to the virtual connection with the identity of the terminal holder 10 in its memory. Conversely, the terminal 10 stores the shared secret and the reference relating to the virtual connection with the identity of the card holder 13 in its memory.

In the above description of FIG. 2, two NFC devices were mentioned, one of which being necessarily a telecommunications terminal comprising the application according to the invention. The other NFC device is an NFC card or a tag, or another telecommunications terminal.

The invention also relates to a computer readable media comprising a software comprising instructions for enabling a virtual connection of two persons each having a NFC device, with one of the NFC devices being a telecommunications terminal comprising the identity of a first one of said persons, with the other NFC device comprising the identity of the second one of said persons, with said software being intended to be installed in the telecommunications terminal and able to read the identity of the second one of said persons. The instructions are intended to:

transmitting the identity of the first one of said persons from said telecommunications terminal to said NFC device;

participating in the generation of a secret shared by the persons, with the shared secret giving access to an Internet space shared by the persons;

storing said shared secret in the telecommunications terminal and in the NFC device, with a reference relating to the virtual connection.

The invention claimed is:

1. A method for virtually connecting two persons, with the first one of said persons having a first NFC device and the second one of said persons having a second NFC device, with one of said NFC devices being a telecommunications terminal comprising an application, with each said NFC device comprising the identity of the person to which it belongs, comprising:

transmitting the identity of said first person from said first NFC device to said second NFC device;

transmitting the identity of said second person from said second NFC device to said first NFC device;

generating, using said application, a secret shared by said persons based on at least one of phone numbers of said persons, geographic locations of said persons, or time of transmitting the identities of said persons, with said shared secret providing access to an online storage space shared by said persons; and storing said shared secret in said NFC devices, with a reference relating to said virtual connection.

2. A method according to claim 1, wherein said reference relating to said virtual connection is the date on which said persons exchanged identities.

3. A method according to claim 1, wherein said reference relating to said virtual connection is the place where said persons exchanged identities.

4. A method according to claim 1, wherein said telecommunications terminal is a mobile terminal.

5. A method according to claim 1, wherein said shared secret is an identifier associated with a password.

6. A telecommunications terminal having stored thereon an application configured to establish a virtual connection of two persons, with said telecommunications terminal comprising the identity of a first one of said persons, wherein said application is configured to read the identity of the second one of said persons, with said identity of said second one of said persons being stored in a NFC device, and wherein said application is configured to cause the telecommunications terminal to perform the following operations:

transmitting the identity of said one of said persons from said telecommunications terminal to said NFC device;

participating in the generation of a secret shared by said persons based on at least one of phone numbers of said persons, geographic locations of said persons, or time of transmitting the identities of said persons, with said secret providing access to an Internet space shared by said persons; and storing said shared secret in said telecommunications terminal and in said NFC device, with a reference relating to said virtual connection.

7. A terminal according to claim 6, wherein said reference relating to said virtual connection is the date on which said persons exchanged identities.

8. A terminal according to claim 6, wherein said reference relating to said virtual connection is the place where said persons exchanged identities.

9. A terminal according to claim 6, wherein said shared secret is an identifier associated with a password.

10. A non-transitory computer readable media having stored thereon software comprising instructions for enabling a virtual connection of two persons each having a NFC device, with one of said NFC devices being a telecommunications terminal comprising the identity of a first one of said persons, with the other NFC device comprising the identity of the second one of said persons, with said software being configured to be installed in said telecommunications terminal and able to read the identity of the second one of said persons, wherein said instructions cause the telecommunications terminal to:
- transmit the identity of said first one of said persons from said telecommunications terminal to said NFC device;
- participate in the generation of a secret shared by said persons based on at lest one of phone numbers of said persons, geographic locations of said persons, or time of transmitting the identities of said persons, with said secret giving providing access to an online storage space shared by said persons; and
- store said shared secret in said telecommunications terminal and in said NFC device, with a reference relating to said virtual connection.

* * * * *